United States Patent
Chan et al.

(10) Patent No.: US 10,705,231 B1
(45) Date of Patent: Jul. 7, 2020

(54) SYSTEMS AND METHODS FOR DETECTING SEISMIC EVENTS

(71) Applicant: STATE FARM MUTUAL AUTOMOBILE INSURANCE COMPANY, Bloomington, IL (US)

(72) Inventors: Aaron Scott Chan, Champaign, IL (US); Kenneth J. Sanchez, San Francisco, CA (US); Jackie O. Jordan, II, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 413 days.

(21) Appl. No.: 15/714,792

(22) Filed: Sep. 25, 2017

(51) Int. Cl.
| | |
|---|---|
| *G01V 1/00* | (2006.01) |
| *B60T 17/18* | (2006.01) |
| *G01P 15/18* | (2013.01) |
| *G06K 9/62* | (2006.01) |
| *G06K 9/00* | (2006.01) |

(52) U.S. Cl.
CPC .............. *G01V 1/008* (2013.01); *B60T 17/18* (2013.01); *G01P 15/18* (2013.01); *G06K 9/6212* (2013.01); *G06K 9/6288* (2013.01); *B60T 2210/30* (2013.01); *G06K 9/00302* (2013.01); *G06K 9/00335* (2013.01)

(58) Field of Classification Search
CPC .................................................... G01V 1/008
See application file for complete search history.

(56) References Cited

U.S. PATENT DOCUMENTS

| | | | |
|---|---|---|---|
| 9,043,329 B1* | 5/2015 | Patton | G06F 16/285 707/740 |
| 9,691,115 B2* | 6/2017 | Abramson | H04M 1/72577 |
| 10,460,534 B1* | 10/2019 | Brandmaier | G08G 1/162 |
| 2011/0313671 A1* | 12/2011 | Nedilko | B61K 9/08 702/14 |
| 2013/0096731 A1* | 4/2013 | Tamari | G08G 1/0129 701/1 |
| 2015/0087264 A1* | 3/2015 | Goyal | G01S 19/34 455/411 |
| 2015/0186497 A1* | 7/2015 | Patton | G06F 16/285 707/740 |
| 2017/0053461 A1* | 2/2017 | Pal | H04W 4/029 |
| 2017/0210323 A1* | 7/2017 | Cordova | G08G 1/0133 |
| 2017/0279957 A1* | 9/2017 | Abramson et al. | H04M 1/72577 |
| 2017/0329332 A1* | 11/2017 | Pilarski | B60W 50/0097 |

(Continued)

*Primary Examiner* — Raymond L Nimox
(74) *Attorney, Agent, or Firm* — Marshall, Gerstein & Borun LLP

(57) ABSTRACT

Systems and methods for determining a probability of an occurrence of a seismic event are provided. According to certain aspects, a system may receive one or more changes in acceleration associated with a plurality of vehicles. The system may receive one or more captured images of a vehicle occupant associated with a given vehicle of the plurality of vehicles. The system may determine a probability of an occurrence of a seismic event according to the one or more changes in acceleration exceeding a threshold and a likelihood that the one or more captured images are associated with an occurrence of a seismic event. Based on the probability exceeding a threshold, the system may provide an output signal that includes at least the determined probability and location information associated with the plurality of vehicles.

20 Claims, 6 Drawing Sheets

(56) References Cited

U.S. PATENT DOCUMENTS

2017/0363504 A1* 12/2017 Winant ............... G01M 5/0066
2018/0001899 A1* 1/2018 Shenoy ................ B60W 40/09

* cited by examiner

SYSTEMS AND METHODS FOR DETECTING SEISMIC EVENTS

FIELD

The present disclosure is directed to using vehicle sensors to detect a seismic event. More particularly, the present disclosure is directed to systems and methods for analyzing and comparing sensor data of multiple vehicles to determine the probability of a seismic event near a location.

BACKGROUND

Generally, most vehicles are equipped with various types of sensors. Some sensors may detect the movement of a vehicle on a roadway and may record data associated with the detected movement. These vehicle sensors may also be used to detect activity that is independent from that of the vehicle. For example, a seismic event may cause the roadway that the vehicle is traveling on to move or vibrate. An occurrence of a seismic event may be detected by some vehicle sensors, but some movements and vibrations may cause false positives to exist in the sensor data (i.e., sensor data that indicates a seismic event when there was no seismic event).

SUMMARY

In one aspect, a method of determining a probability of an occurrence of a seismic event is disclosed. The method may include receiving information indicative of one or more changes in acceleration associated with a plurality of vehicles. The method may also include receiving one or more captured images of a vehicle occupant associated with a given vehicle of the plurality of vehicles. The method may also include determining that the one or more changes in acceleration exceed an acceleration threshold. The method may also include accessing one or more stored images associated with a seismic event. The method may also include comparing the one or more captured images to the one or more stored images. The method may also include based on the comparison, determining a likelihood that the one or more captured images are associated with an occurrence of a seismic event. The method may also include determining a probability of an occurrence of a seismic event according to (i) the one or more changes in acceleration exceeding the acceleration threshold and (ii) the determined likelihood of the one or more captured images. The method may also include based on the probability exceeding a threshold, providing an output signal that includes at least the determined probability and location information associated with the plurality of vehicles.

In another aspect, a system for determining a probability of an occurrence of a seismic event is disclosed. The system includes one or more computing devices. The system also includes a non-transitory computer-readable memory coupled to the one or more computing devices and storing thereon instructions, that when executed by the one or more computing devices, cause the one or more computing devices to receive information indicative of one or more changes in acceleration associated with a plurality of vehicles. The instructions also cause the one or more computing devices to receive one or more captured images of a vehicle occupant associated with a given vehicle of the plurality of vehicles. The instructions also cause the one or more computing devices to determine that the one or more changes in acceleration exceed an acceleration threshold. The instructions also cause the one or more computing devices to access one or more stored images associated with a seismic event. The instructions also cause the one or more computing devices to compare the one or more captured images to the one or more stored images. The instructions also cause the one or more computing devices to, based on the comparison, determine a likelihood that the one or more captured images are associated with an occurrence of a seismic event. The instructions also cause the one or more computing devices to determine a probability of an occurrence of a seismic event according to (i) the one or more changes in acceleration exceeding the acceleration threshold and (ii) the determined likelihood of the one or more captured images. The instructions also cause the one or more computing devices to, based on the probability exceeding a threshold, provide an output signal that includes at least the determined probability and location information associated with the plurality of vehicles.

DETAILED DESCRIPTION

Figure 1:
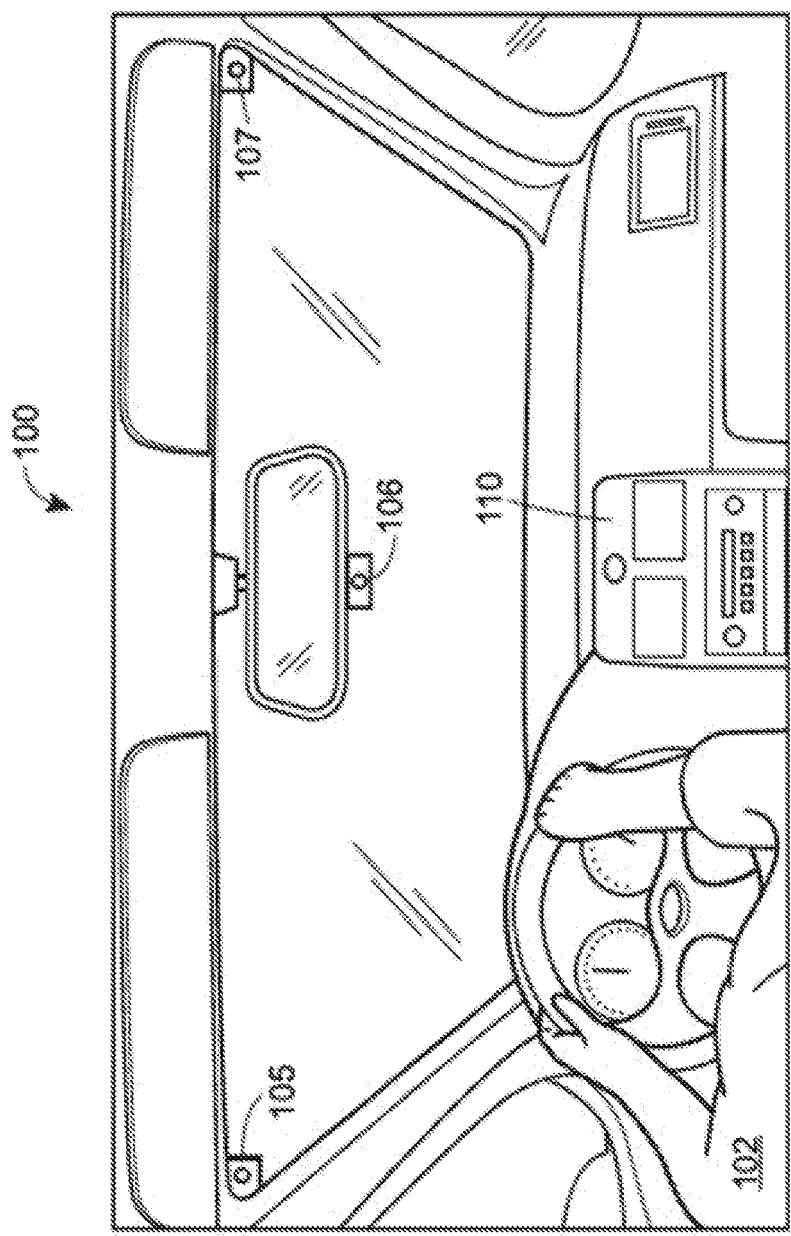
FIG. 1 depicts an exemplary environment within a vehicle including various components configured to facilitate various functionalities, in accordance with some embodiments.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

The present embodiments may relate to, inter alia, detecting, comparing, and analyzing vehicle and occupant data in order to determine an occurrence of a seismic event. In some scenarios, one or more vehicles may be traveling in a geographical area (e.g., a rural area) during an occurrence of a seismic event. In these scenarios, the detection of the seismic event may not occur due to any number of reasons (e.g., strength of the seismic event, outside a detectable range of a seismic detection system, faulty seismometer(s), etc.). Presently, there is no way to properly provide real-time or near real-time detection of a seismic event according to vehicle and occupant data. The present embodiments improve these shortcomings by analyzing vehicle and occupant data within a vehicle in real-time or near-real time in order to detect the occurrence of a seismic event and provide information about the detected event.

In one embodiment, a system may be configured to receive information pertaining to one or more changes in acceleration associated with a vehicle. For example, the system may include sensors (e.g., accelerometers) that are configured to capture acceleration data and provide it to the system for analysis. In one example, a set of sensors coupled to the vehicle may capture acceleration data that is indicative of an unexpected change in acceleration (e.g., a lateral acceleration relative to a direction of travel due to an earthquake).

The system may also be configured to receive information pertaining to one or more changes in vehicle occupant behavior of a given vehicle. For example, the system may include sensors (e.g., image sensors, audio sensors, etc.) that are configured to capture vehicle occupant data and provide it to the system for analysis. In one example, a camera coupled to the vehicle may capture vehicle occupant behavior data that is indicative of a passenger acting in a frantic manner (e.g., sudden head movements). In another example, a microphone within an electronic device (e.g., a smartphone, a tablet, etc.) may capture audio data that is indicative of a passenger screaming.

The system may be configured to analyze the acceleration data and the vehicle occupant data. Based on the analysis, the system may be configured to determine a probability of an occurrence of a seismic event. In one example, according to the analysis, the system may determine the probability of an occurrence of a seismic event based on changes in acceleration associated with a plurality of vehicles within a given area and captured vehicle occupant data that corresponds to the occurrence of a seismic event. The system may also be configured to determine whether the probability of an occurrence of a seismic event exceeds a predetermined threshold in real-time or near real-time.

Based on the probability exceeding a threshold, the system may provide an output signal that includes the determined probability and location information associated with one or more vehicles associated with the seismic event. For example, the system may provide an output signal that includes a probability of occurrence of 85% and global positioning system (GPS) data to a remote server. In this example, the remote server may be associated with emergency personnel and further configured to provide a notification to emergency personnel that includes the determined probability and location information associated with seismic event.

FIG. 1 illustrates an example depiction of an interior of a vehicle 100 that may include various components associated with the systems and methods. In some scenarios, an individual 102 may operate (i.e., drive) the vehicle 100. As depicted in FIG. 1, the interior of the vehicle 100 may support a set of image sensors 105, 106, and 107. In the particular scenario depicted in FIG. 1, each of the image sensors 105, 107 is located near a top corner of the interior of the vehicle 100, and the image sensor 106 is located below a rear view mirror. Although three (3) image sensors are depicted in FIG. 1, it should be appreciated that additional or fewer image sensors are envisioned. Further, it should be appreciated that the image sensors 105, 106, and 107 may be disposed or located at various alternate or additional portions of the vehicle 100, including on an exterior of the vehicle 100.

Each of the image sensors 105, 106, and 107 may be configured to detect and convey information that constitutes an image. In particular, each of the image sensors 105, 106, and 107 may generate digital image data according to the detected information, where the digital image data may be in the form of two-dimensional (2-D) and/or three-dimensional (3-D) image data and/or video data. Although not depicted in FIG. 1, the vehicle 100 may also include one or more audio sensors (e.g., microphones) that may be disposed in one or more locations, where the audio sensors may be configured to capture audio data that may supplement the digital image data captured by the image sensors 105, 106, and 107. It should also be appreciated that image data and/or audio data may also be captured by sensors integrated in an electronic device (e.g., a smartphone, a tablet, a laptop, etc.).

The vehicle 100 may include a vehicle computing system 110 configured with any combination of software and hardware components. In some implementations, the vehicle computing system 110 may be included as part of an on-board diagnostic (OBD) system or any other type of system configured to be installed in the vehicle 100, such as an original equipment manufacturer (OEM) system. The vehicle computing system 110 may include a set of sensors configured to detect and record various telematics data associated with the vehicle 100. In some implementations, the vehicle computing system 110 may be configured to communicate with (i.e., request, retrieve, or receive data from) a set of sensors disposed in other locations of the vehicle 100, such as each of the image sensors 105, 106, and 107, or audio sensors (not shown in FIG. 1), or sensors integrated in an electronic device (not shown in FIG. 1).

According to embodiments, the set of sensors included in the vehicle computing system 110, or otherwise configured to communicate with the vehicle computing system 110, may be of various types. For example, the set of sensors may include a location module (e.g., a global positioning system (GPS) chip), an accelerometer, an ignition sensor, a clock, speedometer, a torque sensor, a throttle position sensor, a compass, a yaw rate sensor, a tilt sensor, a steering angle sensor, a brake sensor, and/or other sensors. The set of sensors may also be configured to detect various conditions of the passengers within vehicle 100, including various biometric information, movements, and/or the like.

The vehicle computing system 110 may be configured to receive information indicative of one or more changes in behavior (e.g., based on data captured by image sensors 105, 106, 107) that coincides with or is subsequent to one or more changes in acceleration associated with at least one vehicle of a plurality of vehicles. The vehicle computing system 110 may include one or more processors (not shown in FIG. 1) that may be configured to analyze information indicative of the one or more changes in behavior. According to the analysis, the vehicle computing system 110 may determine a probability of an occurrence of a seismic event based on the one or more changes in acceleration and the one or more changes in behavior. Based on the probability exceeding a threshold, the vehicle computing system 110 may provide an output signal that includes at least the determined probability and location information associated with the plurality of vehicles.

Figure 2:
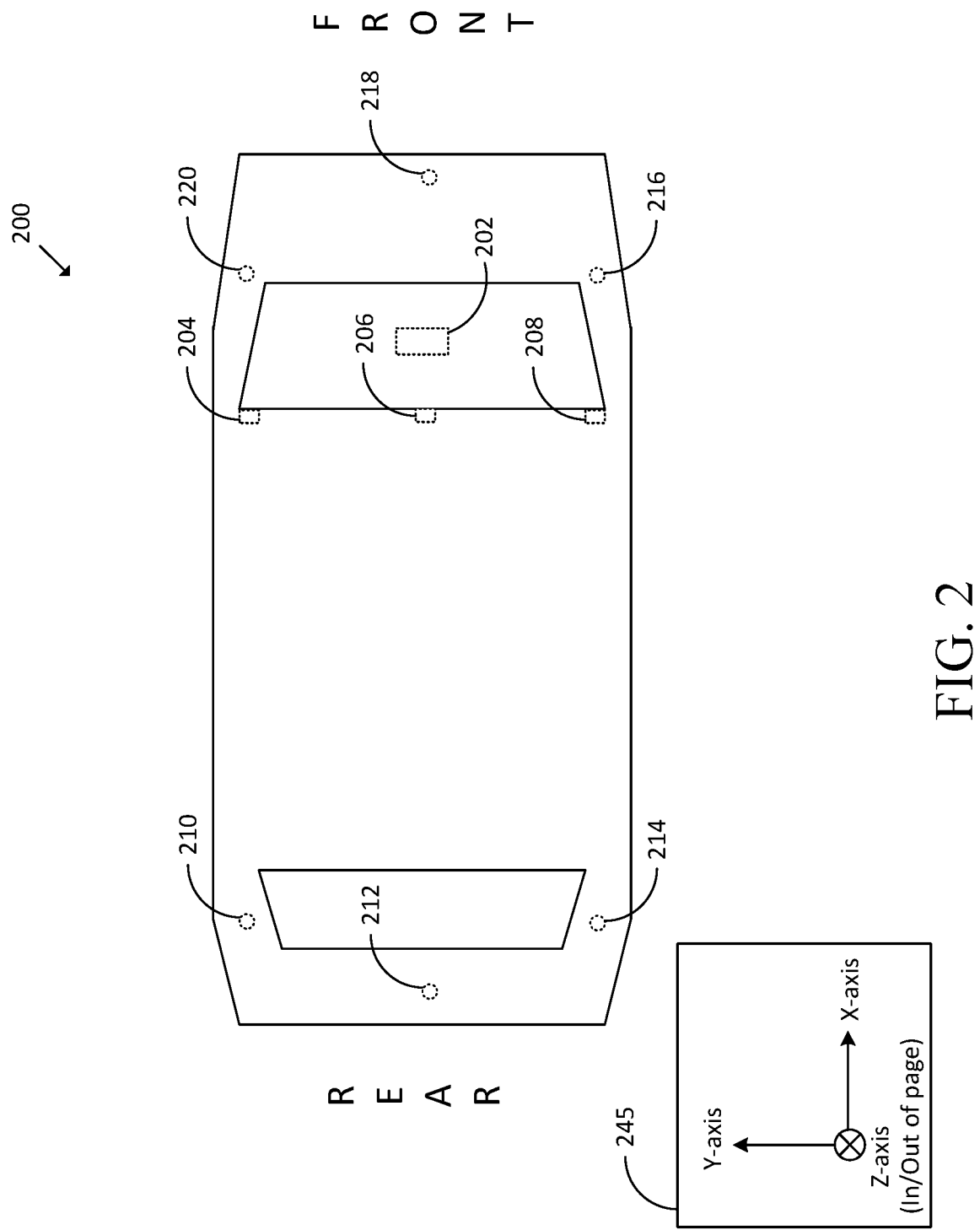
FIG. 2 depicts an exemplary top view of a vehicle with components and the corresponding 3-D axes for seismic event detection, in accordance with some embodiments.

FIG. 2 illustrates an exemplary depiction of a top view of vehicle 200 that may include various components associated with the systems and methods. As shown in FIG. 2, the x, y, and z axes 245 are defined with respect to the position of the vehicle 200. In particular, the x-axis is parallel to the length of the vehicle 200, the y-axis is parallel to the width of the vehicle 200, and the z-axis is parallel to the height of the vehicle 200. The vehicle 200 includes a system 202 and a set of image sensors 204, 206, and 208 (that operate in a similar manner as discussed with the image sensors 105, 106, and 107 of FIG. 1). The vehicle 200 also includes a set of acceleration sensors 210-220, such as accelerometers, located at various locations within or disposed on an exterior of the vehicle 200. In other implementations, the set of acceleration sensors 210-220 may be located at different locations within or disposed on the exterior of the vehicle than what is depicted in FIG. 2.

In some embodiments, the system 202 may include one or more computing devices (not shown in FIG. 2) and a non-transitory computer-readable memory (not shown in FIG. 2) coupled to the one or more computing devices. The non-transitory computer-readable memory may be configured to store instructions that, when executed by the one or more computing devices, cause the one or more computing devices to receive one or more captured images of a vehicle occupant. The one or more captured images of the vehicle occupant may coincide or captured subsequently to the one or more changes in acceleration associated with vehicle 200 or a plurality of vehicles or both, according to an occurrence of a seismic event. In one example, the one or more captured images may captured by one or more sensors (e.g., the set of image sensors 204, 206, and 208) of the vehicle 200.

In one embodiment, the set of image sensors 204, 206, and 208 may capture 2-D and/or 3-D image data of one or more vehicle occupants of the vehicle 200. The image sensors 204, 206, and 208 may provide the captured image data to the system 202 in a real-time basis and/or a near real-time basis. In some embodiments, the system 202 may be configured to activate the image sensors 204, 206, and 208 according to one or more changes in acceleration associated with the vehicle 200. In another embodiment, an audio sensor (not shown in FIG. 2) coupled to the vehicle 200 may be configured to detect a change in behavior (e.g., yelling) associated with an individual within vehicle 200. The audio sensor may provide the captured data to the system 202 also in a real-time basis and/or a near real-time basis. Based on an analysis of the captured data by the image sensor(s) or an audio sensor or both and the one or more changes in acceleration, the system 202 may determine a probability that a seismic event has occurred. In some embodiments, the system 202 may also be configured to analyze subsequent data captured by the image sensor(s) or audio sensor or both in order to determine whether a vehicle occupant has exhibited a change in behavior (e.g., ceased yelling) in order to further assist in determining the probability that a seismic event has occurred.

In one example scenario, the vehicle 200 may be traversing a highway and the set of acceleration sensors 210-220 may detect one or more changes in acceleration along the y-axis that exceed a given threshold. Based on the one or more changes in acceleration, the one or more image sensors 204, 206, and 208 may be activated to capture vehicle occupant behavior. For example, the captured vehicle occupant behavior may include captured images that are indicative of one or more movements associated with a change in behavior (e.g., panic, alarmed, etc.) in response to a possible seismic event. In this scenario, based on the one or more changes in acceleration exceeding the given threshold and the one or more movements associated with the change in behavior, the system 202 may determine a high probability of occurrence of a seismic event. In another example scenario, while the vehicle 200 is traversing a road in need of repair, the set of acceleration sensors 210-220 may detect one or more changes in acceleration along the z-axis and one or more changes in acceleration along the y-axis that do not exceed a given threshold. Further, the system 202 may receive and analyze captured vehicle occupant behavior (e.g., via one or more image sensors 204, 206, and 208) that corresponds to an expected behavior while the vehicle 200 traverses a road in need of repair (e.g., cracks, potholes, etc.). In this scenario, the system may determine a low probability of occurrence of a seismic event.

In one example, one or more audio sensors (not shown in FIG. 2) may detect a sudden change in the volume within vehicle 200 due to an individual (not shown in FIG. 2) beginning to yell as a result of experiencing a seismic event (e.g., an earthquake) while operating the vehicle 200. In some embodiments, one or more computing devices of the system 202 may receive the captured data and perform an analysis according to a set of rules. The set of rules may include one or more instructions for determining a probability of an occurrence of a seismic event according to predetermined criteria. For example, based on an analysis of the frequency and intensity associated with the captured audio data, the set of rules may specify how to calculate a probability of an occurrence of a seismic event.

In some embodiments, the one or more computing devices may use the set of rules and a library of occupant behavior data to analyze the 2-D and/or 3-D image data captured by the set of image sensors 204, 206, and 208 in order to determine the probability of an occurrence of a seismic event. In one implementation, the system 202 may retrieve the library of occupant behavior data from a remote server (not shown) via one or more networks. In another implementation, the system 202 may retrieve the library of occupant behavior data locally stored on the memory of the system 202.

In some embodiments, the one or more computing devices may compare the captured 2-D and/or 3-D image data with the library of occupant behavior data to identify the occupant movements, postures, gestures, or behaviors. In particular, the system 202 may analyze differences and similarities of characteristics or features of the captured 2-D and/or 3-D image data with the library of occupant behavior data to match the captured data to stored data of the library of occupant behavior data. Further, the system 202 may use the match to determine the probability of an occurrence of a seismic event. For example, if the system 202 determines that an individual within the vehicle 200 exhibited an agitated behavior (e.g., sudden head movements) during or subsequent to the one or more changes in acceleration, the system 202 may increase the probability of an occurrence of a seismic event that is commensurate with the determined vehicle occupant behavior. In another example, if the system 202 determines that an individual has stopped the vehicle in a quick manner, the system 202 may increase the probability of an occurrence of a seismic event.

In some embodiments, the analysis may include calculating one or more scores associated with the one or more changes in acceleration and one or more captured images of a vehicle occupant. For example, the system 202 may calculate a higher score to a change in acceleration along the y-axis based on a duration and an amplitude that correlates with a seismic event as opposed to change in acceleration along the x-axis (e.g., the intended direction of travel). The system 202 may also maintain a log that tracks the one or more changes in acceleration of the vehicle 200 in order to refer back to the log and compare historical data. For example, the system 202 may compare the one or more changes in acceleration to historical data to reduce the likelihood of a false positive.

The scores associated with the changes in acceleration and one or more captured images of a vehicle occupant may be aggregated and/or combined in any suitable manner, such as by adding the scores, multiplying the scores, averaging the scores, assigning a weight to each score and adding or multiplying the weighted scores, taking a weighted average of the scores, etc. In any event, the scores may be combined/aggregated to determine the probability of an occurrence of a seismic event. It should be appreciated that other ways of determining the scores are envisioned.

Figure 3:
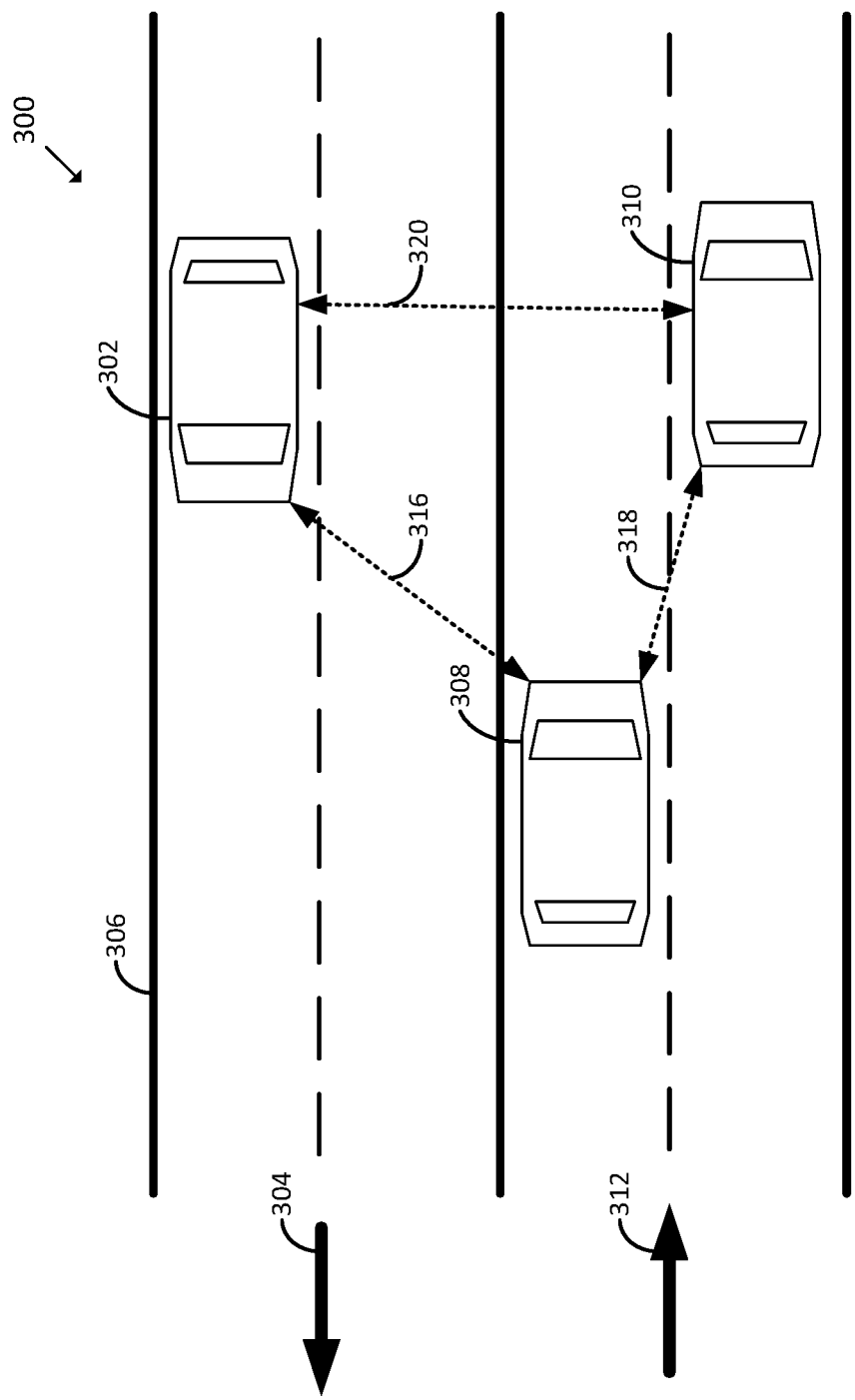
FIG. 3 depicts an example scenario involving multiple vehicles, in accordance with some embodiments.

FIG. 3 illustrates an exemplary scenario 300 depicting three vehicles in operation associated with the systems and methods. In particular, the scenario 300 indicates a vehicle 302 travelling in a direction 304 along highway 306 and vehicle 308 and vehicle 310 travelling in a direction 312 along highway 306. Vehicles 302, 308, and 310 may include various image sensors (such as the sensors 105, 106, and 107 of FIG. 1 or the sensors 204, 206, and 208 of FIG. 2) and acceleration sensors (such as the sensors 210-220 of FIG. 2). Vehicles 302, 308, and 310 may also be equipped with a system (such as the vehicle computing system 110 of FIG. 1 or the system 202 of FIG. 2) for determining a probability of an occurrence of a seismic event. In other scenarios, there may be more or fewer vehicles operating on roadways and any number, including all, of the vehicles may have an associated mobile device. Further, according to embodiments, the system for determining a probability of an occurrence of a seismic event may be a mobile device configured to communicate with an on-board vehicle computer.

In the exemplary scenario 300, during a seismic event, vehicles 302, 308, and 310 may detect one or more changes in a lateral acceleration relative to the one or more directions (direction 304 and direction 312) of travel corresponding to the vehicles 302, 308, and 310. As described above, each of the vehicles 302, 308, and 310 may be configured to determine a probability of an occurrence of a seismic event. For the sake of brevity, operation associated with the systems and methods will be described with respect to vehicle 308.

A system (not shown) for determining a probability of an occurrence of a seismic event of vehicle 308 may receive one or more changes in acceleration associated with the vehicle 308 during the seismic event. The system of vehicle 308 may also be configured to receive one or more changes in acceleration associated with vehicle 302 and one or more changes in acceleration associated with vehicle 310. The system of vehicle 308 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others) to communicate with vehicle 302 and vehicle 310.

The system of vehicle 308 may also be configured to capture data via one or more image sensors (such as one or more of image sensors 105, 106, and 107 of FIG. 1, one or more image sensors 204, 206, and 208 of FIG. 2) that coincides or is subsequent to the one or more changes in acceleration of vehicle 308. In another example, the one or more image sensors may be configured to capture image data upon receipt of one or more changes in acceleration of vehicle 302 or vehicle 310 or both. One or more processors (not shown) may be configured to determine a probability of an occurrence of a seismic event according to the one or more changes in acceleration associated with vehicles 302, 308, and 310 and the one or more captured images of a vehicle occupant of vehicle 308. In one example, in addition to the one or more changes in acceleration, the directions of travel associated with vehicles 302 and 310 may be used to determine the probability of an occurrence of a seismic event. In this example, the system of vehicle 308 may determine a higher probability according to a difference in directions of travel associated with vehicles 302 and 310.

In another example, the system of vehicle 308 may use a distance 316 between vehicle 302 and 308, a distance 318 between vehicle 302 and vehicle 310, and a distance 320 between vehicle 302 and 310 when determining the probability of an occurrence of a seismic event. For example, the greater the distances between vehicles 302, 308, and 310, the less likely that the one or more changes in acceleration is not caused by a seismic event and instead related to one or more issues (e.g., construction, potholes, etc.) with highway 306. Therefore, the system of vehicle 308 may be configured to determine a higher probability of an occurrence of a seismic event based at least in part due to the distances between vehicles 302, 308, and 310 that satisfy one or more distance thresholds. It should be appreciated that other types of calculations, algorithms, comparisons, or techniques are envisioned.

The system of vehicle 308 may be configured to analyze captured image data using one or more software algorithms to identify possible movements, postures, gestures, or behaviors that could be indicative of being alarmed or frightened associated with one or more passengers within vehicle 308 according to an occurrence of a seismic event. For example, the system of vehicle 308 may analyze differences and similarities of characteristics indicated in captured movements with movements included in a library of movements, where the characteristics may include movement(s) of specific body parts (e.g., right arm), direction(s) of movement(s), and distance(s) of movement(s). In some implementations, the library of movements may include eye-tracking movements, head-tracking movements, gesture-tracking movements, occupant posture, and/or other visual data that indicates occupant movements or behaviors associated with an occurrence of a seismic event. In one implementation, the system may access the library of movements from local memory or from remote storage via a network connection.

The system of vehicle 308 may analyze the one or more changes in acceleration and the vehicle occupant behavior in order to determine the probability of an occurrence of a seismic event. In particular, the system of vehicle 308 may assign a first score to the one or more changes in acceleration and a second score to the one or more captured images of a vehicle occupant according to a set of rules. For example, a first score of 50 may be assigned to the one or more changes in acceleration based on a determination that the vehicles 302, 308, and 310 are associated with one or more changes in a lateral acceleration relative to a respective direction of travel. Further, a second score of 40 may be assigned to the one or more captured images of a vehicle occupant based on a comparison of one or more features of captured images within vehicle 308 and stored images associated with an occurrence of a seismic event. The system of vehicle 308 may combine both scores in order to determine a probability of occurrence of a seismic event based on a score of 90. In this example, the system of vehicle 308 may determine the probability of an occurrence of a seismic event to be at 90%.

Figure 4:
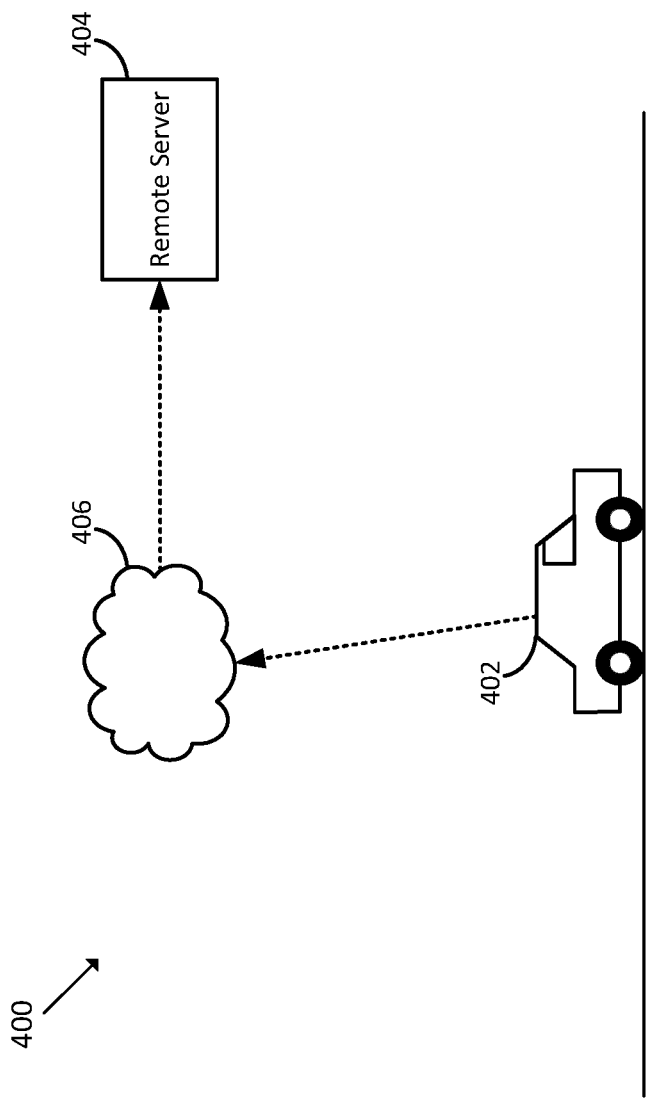
FIG. 4 depicts another example scenario involving multiple vehicles, in accordance with some embodiments.

FIG. 4 illustrates an exemplary scenario 400 depicting vehicle 402 facilitating certain functionalities associated with the systems and methods. As shown, vehicle 402 is in communication with remote server 404 via network 406. In certain embodiments, the network 406 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network 406 may also be one or more private or local networks or dedicated frequency bands.

In the exemplary scenario 400, a system (such as the vehicle computing system 110 of FIG. 1 or the system 202 of FIG. 2) of vehicle 402 may have determined the probability of an occurrence of a seismic event according to one or more changes in acceleration associated with a plurality of vehicles and one or more captured images of a vehicle occupant of vehicle 402. The system of vehicle 402 may be configured to determine to proceed with one or more subsequent actions if the probability exceeds a predetermined threshold.

In one example, the system of vehicle 402 may have determined that the probability of occurrence exceeds a probability threshold, in which the probability threshold indicates a high likelihood of a seismic event. For example, if the probability of occurrence is greater than 75%, the system of vehicle 402 may be configured to provide an output signal to the remote sever 404 via the network 406, as shown in FIG. 4. If the probability of occurrence does not meet the probability threshold, the system of vehicle 402 may return to a predetermined state or proceed to other functionality associated with vehicle 402. For example, if the probability is less than 10%, the system of vehicle 402 may be configured to take no additional action.

In the event that the probability of occurrence exceeds the probability threshold, the output signal may include at least the determined probability (e.g., 90%) and location information associated with one or more vehicles associated with the occurrence of the seismic event. The remote server 404 may be configured to store information based on the output signal and take additional action. For example, the remote server 404 may be associated with an agency such as a police department, fire department, EMS, etc. and configured to provide an alert to appropriate emergency personnel. In another example, the remote server 404 may be associated with a road assistance provider, the insurance provider for vehicle 402, etc., and provide one or more notifications to authorized individuals.

Figure 5:
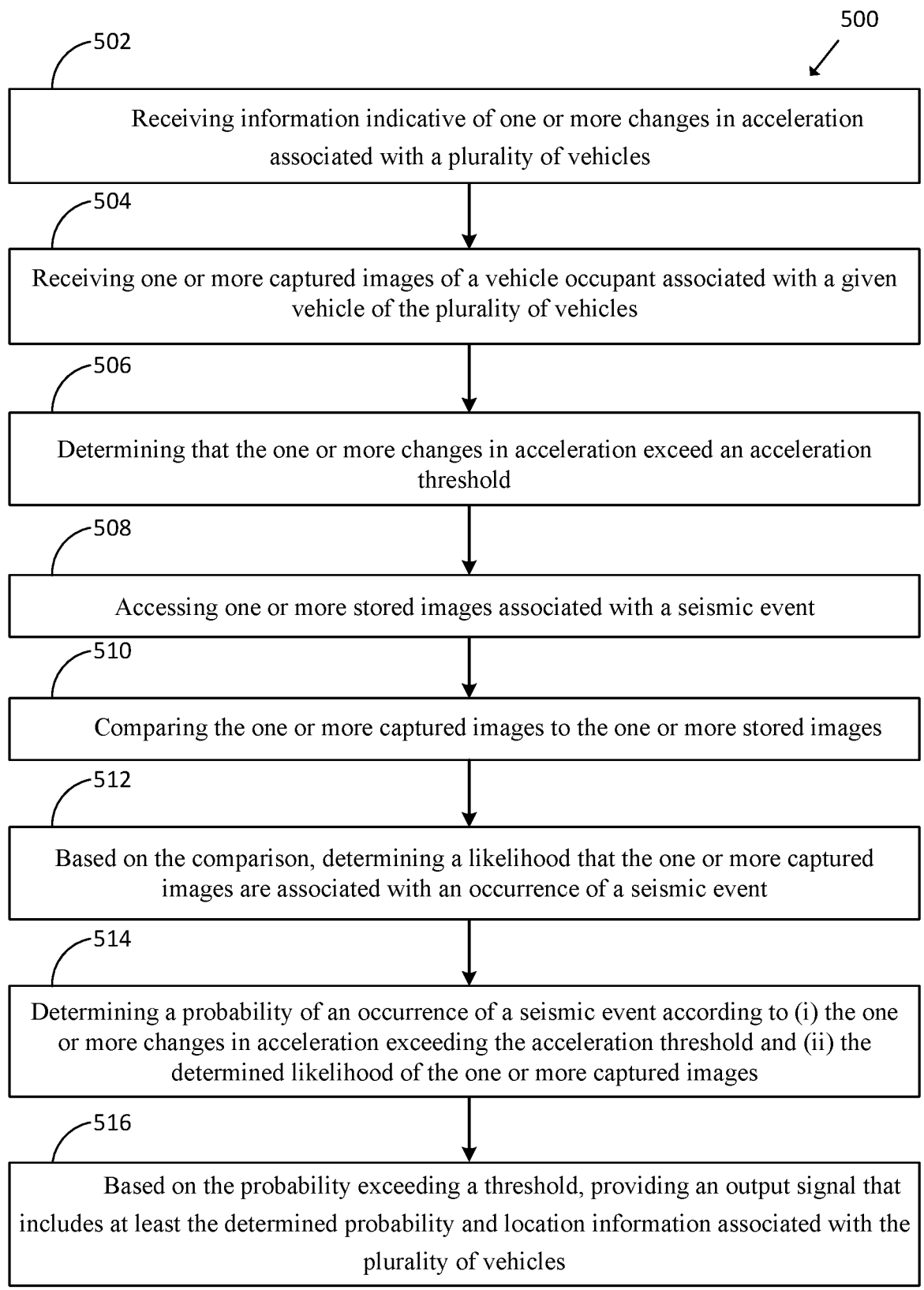
FIG. 5 depicts an exemplary flow diagram associated with seismic event detection, in accordance with some embodiments.

FIG. 5 is a flow diagram of an example method for determining a probability of an occurrence of a seismic event, in accordance with at least some of the embodiments described herein. Although the blocks in FIG. 5 are illustrated in a sequential order, the blocks may in some instance be performed in parallel, and/or in a different order than those described therein. Also, the various blocks may be combined into fewer blocks, divided into additional blocks, and/or removed based upon the desired implementation.

In addition, the flow diagram of FIG. 5 shows the functionality and operation of one implementation of the present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer-readable media that stores data for short periods of time, such as register memory, processor cache, or Random Access Memory (RAM), and/or persistent long term storage, such as read only memory (ROM), optical or magnetic disks, or compact-disc read only memory (CD-ROM), for example. The computer readable media may also be, or include, any other volatile or non-volatile storage systems. The computer readable medium may be considered a computer readable storage medium, a tangible storage device, or other article of manufacture, for example.

Alternatively, each block in FIG. 5 may represent circuitry that is wired to perform the specific logical functions in the process. Illustrative methods, such as those shown in FIG. 5, may be carried out in whole or in part by a component or components in the cloud and/or system. However, it should be understood that the example method may instead be carried out by other entities or combinations of entities (i.e., by other computing devices and/or combinations of computing devices), without departing from the scope of the invention. For example, functions of the method of FIG. 5 may be fully performed by a computing device (or components of a computing device such as one or more processors), or may be distributed across multiple components of the computing device, across multiple computing devices, and/or across a server.

Referring to FIG. 5, the example method 500 may include one or more operations, functions, or actions as illustrated by blocks 502-516. In one embodiment, the method 500 is implemented in whole or in part by the system 110 of FIG. 1 (or one or more processors thereof) or the system 202 of FIG. 2 (or one or more processors thereof).

The method 500 includes receiving, at a vehicle computing system including one or more processors, information indicative of one or more changes in acceleration associated with a plurality of vehicles (block 502). In some embodiments, the one or more changes in acceleration includes captured data along one or more axes relative to a direction of travel associated with a vehicle. In some embodiments, the one or more processors may determine one or more forces along the one or more axes based on the captured data. The one or more processors may also be configured to determine whether one or more characteristics of the one or more forces exceeds a force threshold associated with an occurrence of a seismic event. For example, the one or more characteristics may include at least one of a frequency, a duration, and an amplitude associated with a given force of the one or more forces.

The method 500 also includes receiving, at the vehicle computing system, one or more captured images of a vehicle occupant associated with a given vehicle of the plurality of vehicles (block 504). In some embodiments, the vehicle computing system may be configured to receive audio data and image data. In one example, the one or more sensors of the vehicle may include audio sensors (e.g., microphones) that are positioned in various locations throughout the vehicle. In another example, the one or more sensors may include an image sensor and an audio sensor that are part of a mobile electronic device (e.g., smartphone, tablet, etc.). The vehicle computing system may be configured to receive the information indicative of the one or more changes in behavior in a real-time basis or near real-time basis.

In one example, the analysis of the captured images may include a comparison of one or more features of the captured image data to one or more features of stored image data associated with an occurrence of a seismic event. The one or more features may be associated with one or more facial expressions that correspond to an occurrence of a seismic event. Based on the comparison, the one more processors may be configured to determine a likelihood that the captured image data is associated with an occurrence of a seismic event. For instance, the vehicle computing system may determine that the captured image data corresponds to a facial expression that is associated with fear (e.g., face covered by hands, eyes wide open, etc.) according to an occurrence of a seismic event. In this instance, the vehicle computing system may determine a higher likelihood that the captured image data is associated with an occurrence of a seismic event.

In another example, the audio data captured by one or more audio sensors may be used to assist in determining the probability of an occurrence of a seismic event. For instance, the one or more audio sensors may be configured to capture data at a different sampling rate depending on the one or more changes in acceleration. In this example, the analysis may include detecting an increase or decrease in decibel levels associated with one or more occupants in the vehicle. Further, based on the increase or decrease in decibel levels, the vehicle computing system may determine a likelihood that the captured audio data is associated with an occurrence of a seismic event.

The method 500 also includes determining, by the one or more processors, that the one or more changes in acceleration exceed an acceleration threshold (block 506). In some embodiments, the acceleration threshold may be determined according to manufacturing data corresponding to a given vehicle.

The method 500 also includes accessing, by the vehicle computing system, one or more stored images associated with a seismic event (block 508). In some embodiments, the one or more stored images may be accessed via network connected a remote server or a database coupled to the vehicle. In some examples, the stored images may be associated with one or more behaviors of vehicle occupants reacting to an emergency or an unexpected event such as a seismic event. For example, the stored images may include images of vehicle occupants bracing or grabbing a handle between the A-pillar and B-pillar of the vehicle.

The method 500 also includes comparing, by the one or more processors, the one or more captured images to the one or more stored images (block 510). In one example, based on the comparison, the one or more processors may determine that the vehicle occupant is in a posture expressing shock based on a high probability of an occurrence of a seismic event. In another example, the one or more processors may determine a gesture associated with common driving behavior. For instance, the gesture may be indicative of the vehicle occupant adjusting the climate control within the vehicle based on a low probability of an occurrence of a seismic event.

The method 500 also includes based on the comparison, determining, by the one or more processors, a likelihood that the one or more captured images are associated with an occurrence of a seismic event (block 512). In some embodiments, the likelihood may be determined according to a comparison of one or more features of the one or more captured images to one or more features of at least one of a plurality of stored images. In some examples, the one more features may be associated with one or more facial expressions that correspond to an occurrence of a seismic event. In some embodiments, the likelihood may be determined according to a determined gesture of the vehicle occupant. For example, a low likelihood may be determined according to a gesture associated with using a mobile device (e.g., texting with the mobile device, using the mobile device during a call, etc.).

The method 500 also includes determining, by the one or more processors, a probability of an occurrence of a seismic event according to (i) the one or more changes in acceleration exceeding the acceleration threshold and (ii) the determined likelihood of the one or more captured images (block 514). In one example, the method 500 may include determining, by the one or more processors, whether the one or more changes in acceleration exceed a first threshold associated with a lateral acceleration relative to a direction of travel of a given vehicle. In this example, the method 500 may include receiving, at the vehicle computing system, information indicative of vehicle operation of the given vehicle subsequent to the one or more changes in acceleration. Based on the information indicative of vehicle operation of the given vehicle, the method 500 may include determining, by the one or more processors, whether one or more subsequent changes in acceleration exceed a second threshold associated with a deceleration of the given vehicle. For instance, subsequent to the occurrence of a seismic event, an initial reaction of a vehicle occupant operating (i.e., driving) the given vehicle may be to apply the brakes and reduce speed as quickly as possible. Further, the method 500 may also include based on exceeding (i) the first threshold and (ii) the second threshold, adjusting, by the one or more processors, the determined probability of an occurrence of a seismic event.

In another example, the method 500 may include receiving, at the vehicle computing system, information indicative of historical vehicle movement of the given vehicle. In this example, the method 500 may include determining, by the one or more processors, one or more historical changes in acceleration according to the historical vehicle movement. The method 500 may include comparing, by the one or more processors, the one or more historical changes in acceleration to the one or more changes in acceleration. Further, the method 500 may include based on the comparison, adjusting, by the one or more processors, the probability of an occurrence of a seismic event.

In some embodiments, the method 500 may include receiving, at the vehicle computing system, information indicative of vehicle operation of the given vehicle. The information indicative of vehicle operation of the give vehicle may be captured subsequent to the one or more changes in acceleration. For example, the information indicative of the vehicle operation may include one or more sudden changes in the direction of travel associated with the given vehicle. In another example, the vehicle computing system may receive information indicative of a braking event that occurred subsequent to the one or more changes in acceleration and analyze one or more characteristics associated with the braking event to determine the probability of an occurrence of a seismic event. Further, the method 500 may include determining, by the one or more processors, the probability of an occurrence of a seismic event according to (i) the information indicative of the one or more changes in acceleration, (ii) the one or more captured images, and (iii) the information indicative of vehicle operation.

The method 500 also includes based on the probability exceeding a threshold, providing, by the vehicle computing system, an output signal that includes at least the determined probability and location information associated with the plurality of vehicles (block 516). In one example, the probability may be provided as a percentage and the location information may include GPS data corresponding to the plurality of vehicles. In another example, the probability may be provided as a score or as a description such as "Low" or "High." It should be appreciated that other ways of providing the probability are envisioned.

Figure 6:
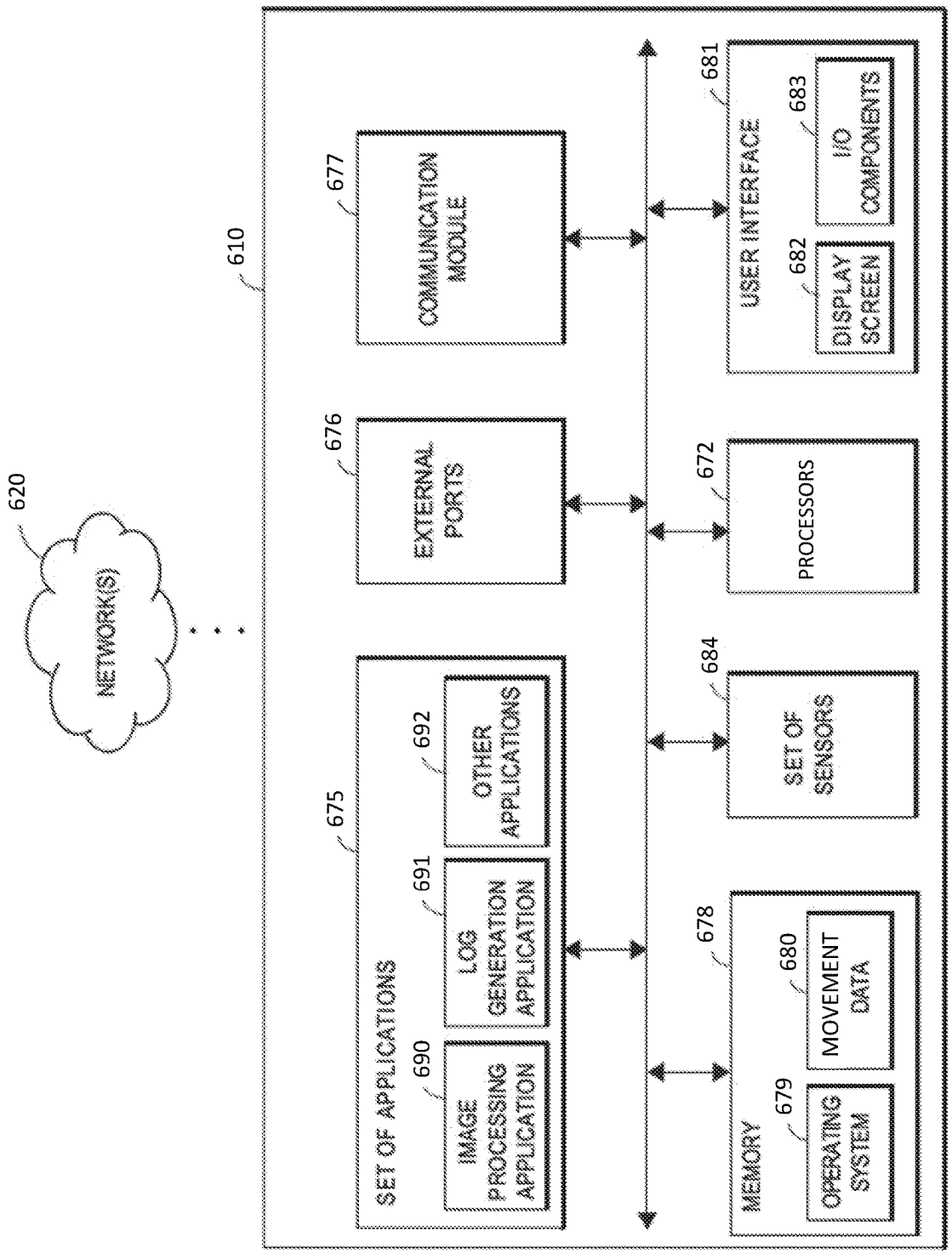
FIG. 6 is a block diagram of an exemplary system for seismic event detection, in accordance with some embodiments.

FIG. 6 illustrates a diagram of an exemplary system 610 (such as the system 110 of FIG. 1 or the system 202 of FIG. 2) in which the functionalities as discussed herein may be implemented. It should be appreciated that the system 610 may be configured to be transported in a vehicle and/or connect to an on-board telematics platform of the vehicle, as discussed herein. Further, it should be appreciated that the system 610 may be integrated into an on-board system of the vehicle.

The system 610 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be an image processing application 690 configured to analyze image data corresponding to vehicle occupant behavior, and a log generation application 691 configured to interface with sensors and generate behavior logs that may include vehicle occupant data. It should be appreciated that one or more other applications 692 are envisioned, such as an application configured to interface wirelessly with one or more electronic devices (e.g., smartphone, tablet, etc.).

The processor 672 may interface with the memory 678 to execute the operating system 679 and the set of applications 675. According to some embodiments, the memory 678 may also include a library of occupant behavior data 680. In some implementations, the image processing application 690 may interface with the occupant behavior data 680 to retrieve occupant behavior data and analyze the captured 2-D and/or 3-D image data with the occupant behavior data. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The system 610 may further include a communication module 677 configured to communicate data via one or more networks 620. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676. Further, the communication module 677 may include a short-range network component (e.g., an RFID reader) configured for short-range network communications. For example, the communication module 677 may receive, via the network 620, a library of occupant behavior data from a remote server. For further example, the communication module 677 may transmit data to and receive data from a remote server via the network 620.

The system 610 may further include a set of sensors 584 (such as the image sensors 105, 106, and 107 of FIG. 1, the image sensors 204, 206, and 208 of FIG. 2, and the acceleration sensors 210, 212, 214, 216, 218, and 220 of FIG. 2). The processor 672 and the set of applications 675 may interface with the set of sensors 684 to retrieve and process the corresponding sensor data. The set of sensors 684 may include, for example, one or more image sensors, audio sensors, various biometric sensors capable of sensing various biometric data as discussed herein, and/or the like. In one particular implementation, the log generation application 691 may use various data from the set of sensors 684 to generate logs of recorded seismic events.

The system 610 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs, speakers, microphones). According to some embodiments, the user may access the system 610 via the user interface 681 to review information and/or perform other functions. In some embodiments, the system 610 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor(s) 672 (e.g., working in connection with the operating system 679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method comprising:
   receiving, at a vehicle computing system including one or more processors, information indicative of one or more changes in acceleration associated with a plurality of vehicles;
   receiving, at the vehicle computing system, one or more captured images of a vehicle occupant associated with a given vehicle of the plurality of vehicles;
   determining, by the one or more processors, that the one or more changes in acceleration exceed an acceleration threshold;
   accessing, by the vehicle computing system, one or more stored images associated with a seismic event;
   comparing, by the one or more processors, the one or more captured images to the one or more stored images;
   based on the comparison, determining, by the one or more processors, a likelihood that the one or more captured images are associated with an occurrence of a seismic event;

determining, by the one or more processors, a probability of an occurrence of a seismic event according to (i) the one or more changes in acceleration exceeding the acceleration threshold and (ii) the determined likelihood of the one or more captured images; and based on the probability exceeding a threshold, providing, by the vehicle computing system, an output signal that includes at least the determined probability and location information associated with the plurality of vehicles.

2. The computer-implemented method of claim 1, wherein the information indicative of one or more changes in acceleration includes one or more changes in a lateral acceleration relative to one or more directions of travel corresponding to the plurality of vehicles.

3. The computer-implemented method of claim 1, wherein determining the likelihood of the one or more captured images further includes:

based on the comparison, determining, by the one or more processors, a gesture of the vehicle occupant; and based on the determined gesture, determining, by the one or more processors, the likelihood that the one or more captured images are associated with an occurrence of a seismic event.

4. The computer-implemented method of claim 1, wherein determining the likelihood of the one or more captured images further includes:

comparing, by the one or more processors, one or more features of the one or more captured images to one or more features of at least one of the plurality of stored images, wherein the one or more features are associated with one or more facial expressions that correspond to an occurrence of a seismic event; and based on the comparison, determining, by the one or more processors, the likelihood that the one or more captured images are associated with an occurrence of a seismic event.

5. The computer-implemented method of claim 1, wherein the information indicative of one or more changes in acceleration includes captured data along one or more axes relative to a direction of travel associated with a vehicle, wherein determining the probability of an occurrence of a seismic event further comprises:

determining, by the one or more processors, one or more forces along the one or more axes based on the captured data;

determining, by the one or more processors, that one or more characteristics of the one or more forces exceeds a force threshold associated with an occurrence of a seismic event; and based on the determined one or more characteristics exceeding the force threshold, adjusting, by the one or more processors, the determined probability of an occurrence of a seismic event.

6. The computer-implemented method of claim 5, wherein the one or more characteristics include at least one of a frequency, a duration, and an amplitude associated with a given force of the one or more forces.

7. The computer-implemented method of claim 1, wherein determining the probability of an occurrence of a seismic event further comprises:

receiving, at the vehicle computing system, information indicative of vehicle operation of the given vehicle subsequent to the one or more changes in acceleration; and determining, by the one or more processors, the probability of an occurrence of a seismic event according to (i) the one or more changes in acceleration exceeding the acceleration threshold and (ii) the determined likelihood of the one or more captured images, and (iii) the information indicative of vehicle operation.

8. The computer-implemented method of claim 7, wherein the information indicative of the vehicle operation includes a braking event subsequent to the one or more changes in acceleration.

9. The computer-implemented method of claim 1, wherein determining the probability of an occurrence of a seismic event further comprises:

receiving, at the vehicle computing system, information indicative of historical vehicle movement of the given vehicle;

determining, by the one or more processors, one or more historical changes in acceleration according to the historical vehicle movement;

comparing, by the one or more processors, the one or more historical changes in acceleration to the one or more changes in acceleration; and based on the comparison, adjusting, by the one or more processors, the determined probability of an occurrence of a seismic event.

10. The computer-implemented method of claim 1, wherein determining the probability of an occurrence of a seismic event further comprises:

determining, by the one or more processors, whether the one or more changes in acceleration exceed a first threshold associated with a lateral acceleration relative to a direction of travel;

receiving, at the vehicle computing system, information indicative of vehicle operation of the given vehicle subsequent to the one or more changes in acceleration;

based on the information indicative of vehicle operation of the given vehicle, determining, by the one or more processors, whether one or more subsequent changes in acceleration exceed a second threshold associated with a deceleration of the given vehicle; and based on exceeding (i) the first threshold and (ii) the second threshold, adjusting, by the one or more processors, the determined probability of an occurrence of a seismic event.

11. A system comprising:

one or more computing devices; and a non-transitory computer-readable memory coupled to the one or more computing devices and storing thereon instructions, that when executed by the one or more computing devices, cause the one or more computing devices to:

receive information indicative of one or more changes in acceleration associated with a plurality of vehicles;

receive one or more captured images of a vehicle occupant associated with a given vehicle of the plurality of vehicles;

determine that the one or more changes in acceleration exceed an acceleration threshold;

access one or more stored images associated with a seismic event;

compare the one or more captured images to the one or more stored images;

based on the comparison, determine a likelihood that the one or more captured images are associated with an occurrence of a seismic event;

determine a probability of an occurrence of a seismic event according to (i) the one or more changes in acceleration exceeding the acceleration threshold and (ii) the determined likelihood of the one or more captured images; and based on the probability exceeding a threshold, provide an output signal that includes at least the determined probability and location information associated with the plurality of vehicles.

12. The system of claim 11, wherein the information indicative of one or more changes in acceleration includes one or more changes in a lateral acceleration relative to one or more directions of travel corresponding to the plurality of vehicles.

13. The system of claim 11, wherein the instructions that cause the one or more computing devices to determine determining the likelihood of the one or more captured images further include instructions to:

based on the comparison, determine a gesture of the vehicle occupant; and based on the determined gesture, determine the likelihood that the one or more captured images are associated with an occurrence of a seismic event.

14. The system of claim 11, wherein the instructions that cause the one or more computing devices to determine determining the likelihood of the one or more captured images further include instructions to:

compare one or more features of the one or more captured images to one or more features of at least one of the plurality of stored images, wherein the one or more features are associated with one or more facial expressions that correspond to an occurrence of a seismic event; and based on the comparison, determine the likelihood that the one or more captured images are associated with an occurrence of a seismic event.

15. The system of claim 11, wherein the information indicative of one or more changes in acceleration includes captured data along one or more axes relative to a direction of travel associated with a vehicle, wherein the instructions that cause the one or more computing devices to determine the probability of an occurrence of a seismic event further include instructions to:

determine one or more forces along the one or more axes based on the captured data; and determine that one or more characteristics of the one or more forces exceeds a force threshold associated with an occurrence of a seismic event; and based on the determined one or more characteristics exceeding the force threshold, adjust the determined probability of an occurrence of a seismic event.

16. The system of claim 15, wherein the one or more characteristics include at least one of a frequency, a duration, and an amplitude associated with a given force of the one or more forces.

17. The system of claim 11, wherein the instructions that cause the one or more computing devices to determine the probability of an occurrence of a seismic event further include instructions to:

receive information indicative of vehicle operation of the given vehicle subsequent to the one or more changes in acceleration; and determine the probability of an occurrence of a seismic event according to (i) the one or more changes in acceleration exceeding the acceleration threshold and (ii) the determined likelihood of the one or more captured images, and (iii) the information indicative of vehicle operation.

18. The system of claim 17, wherein the information indicative of the vehicle operation includes a braking event subsequent to the one or more changes in acceleration.

19. The system of claim 11, wherein the instructions that cause the one or more computing devices to determine the probability of an occurrence of a seismic event further include instructions to:

receive information indicative of historical vehicle movement of the given vehicle;

determine one or more historical changes in acceleration according to the historical vehicle movement;

compare the one or more historical changes in acceleration to the one or more changes in acceleration; and based on the comparison, adjust, the determined probability of an occurrence of a seismic event.

20. The system of claim 11, wherein the instructions that cause the one or more computing devices to determine the probability of an occurrence of a seismic event further include instructions to:

determine whether the one or more changes in acceleration exceed a first threshold associated with a lateral acceleration relative to a direction of travel;

receive information indicative of vehicle operation of the given vehicle subsequent to the one or more changes in acceleration;

based on the information indicative of vehicle operation of the given vehicle, determine whether one or more subsequent changes in acceleration exceed a second threshold associated with a deceleration of the given vehicle; and based on exceeding (i) the first threshold and (ii) the second threshold, adjust the determined probability of an occurrence of a seismic event.

* * * * *